Patented Nov. 8, 1932

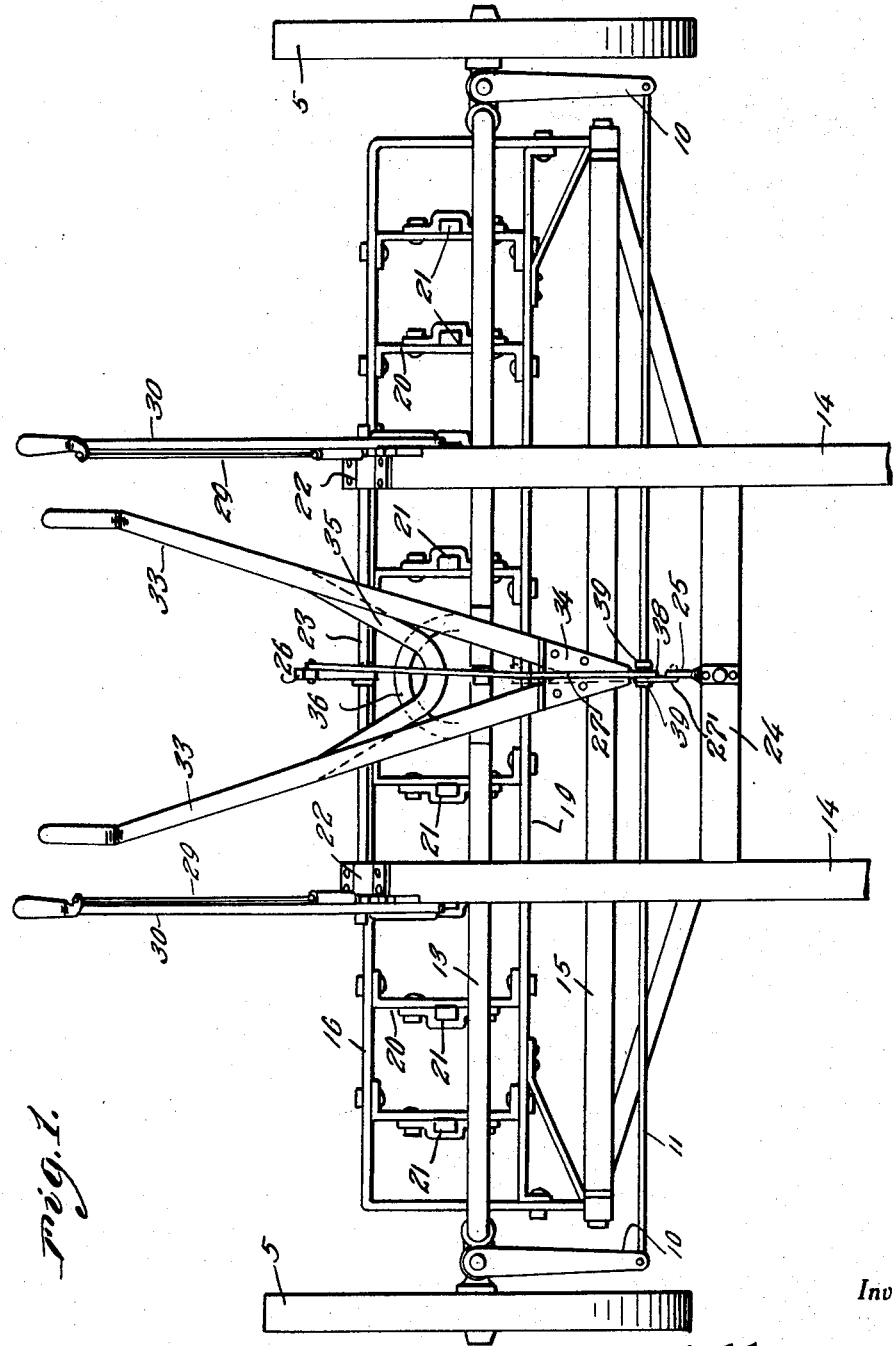

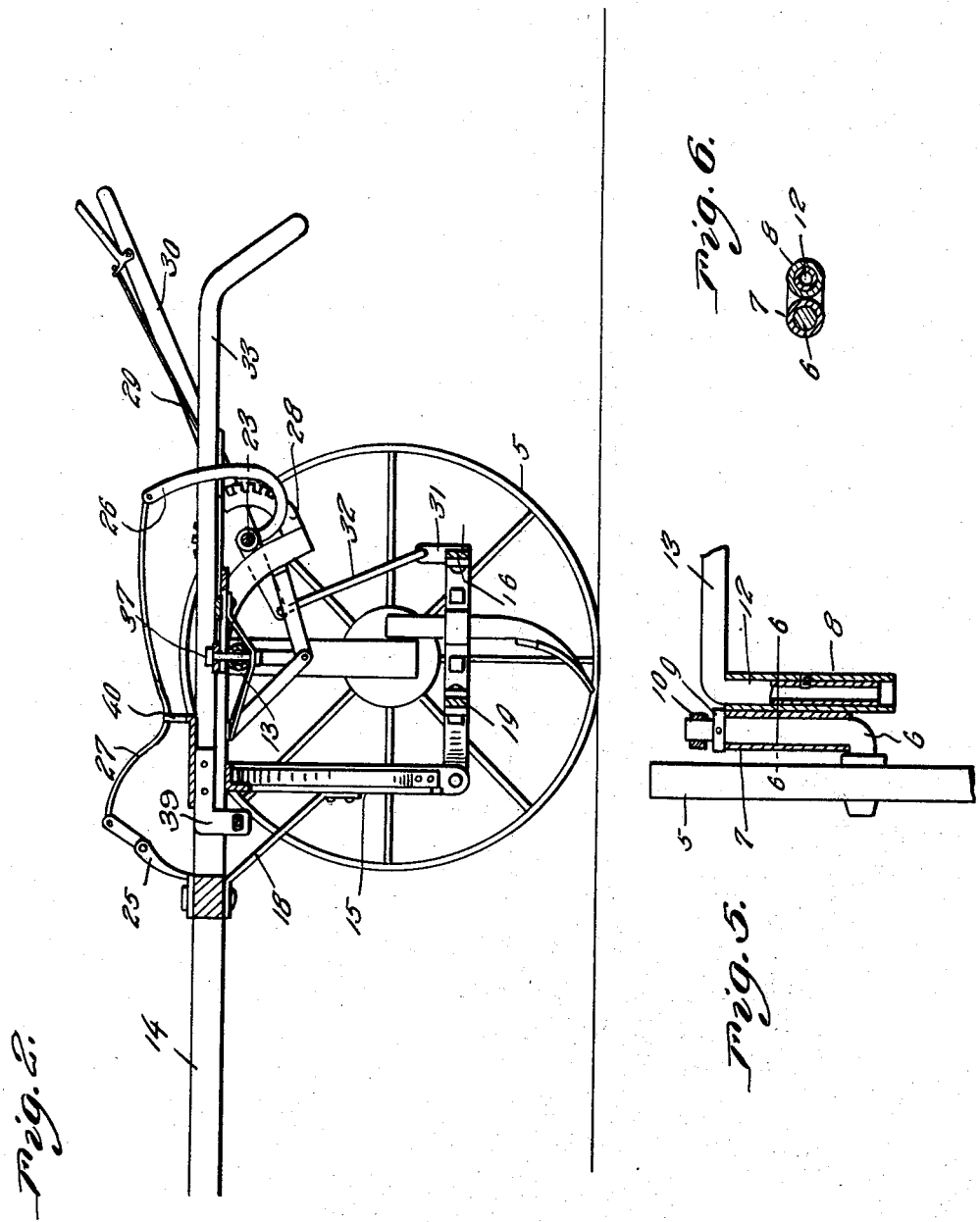

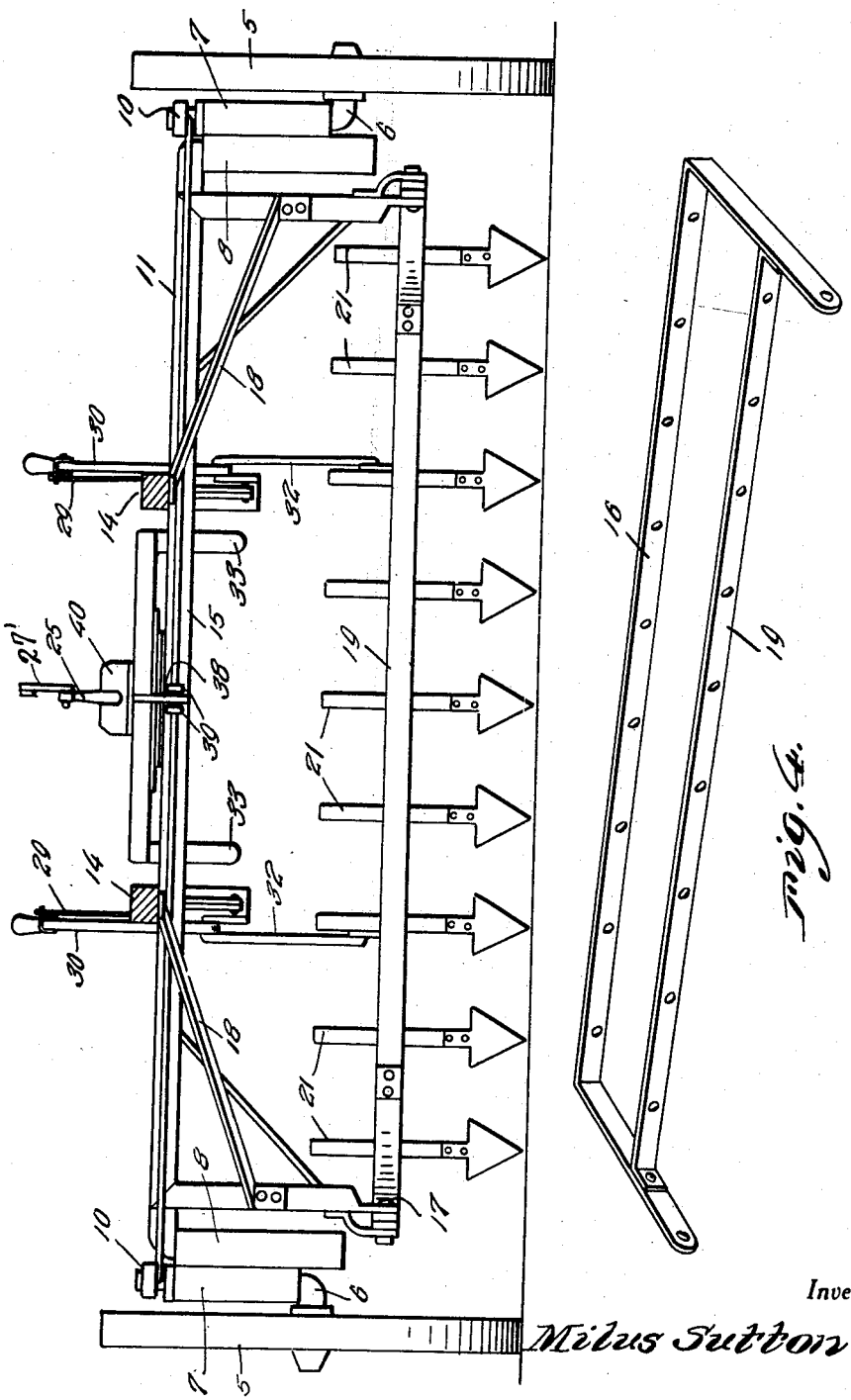

1,887,441

UNITED STATES PATENT OFFICE

MILUS SUTTON, OF ELKO, GEORGIA

COTTON BUNCHING MACHINE

Application filed December 29, 1930. Serial No. 505,415.

This invention appertains to new and useful improvements in machines for bunching cotton.

The principal object of this invention is to provide a machine for bunching cotton which will be a labor and time saving item in use in the cultivation of cotton.

Another important object of the invention is to provide a cotton bunching machine which will be easy to operate, capable of being adjusted, and which in use will not be susceptible to the developments of ready defects.

Other important objects and advantages of the invention will become apparent to the reader of the following specification.

In the drawings:—

Figure 1 represents a top plan view of the machine.

Fig. 2 represents a vertical sectional view through the machine.

Fig. 3 represents a cross sectional view through the draft bars of the implement looking toward the machine.

Fig. 4 represents a perspective view of the horizontal frame.

Fig. 5 represents a fragmentary detailed sectional view of the wheel mount.

Fig. 6 represents a cross sectional view taken substantially on the line 6—6 of Fig. 5.

Referring to the drawings wherein like numerals designate like parts, it can be seen that the machine includes a pair of wheels 5—5, provided each with an L-shaped axle 6. Each of these axles 6 has its lower portion disposed into the wheel, while its upper portion is journalled through a sleeve 7 which is secured to a second sleeve 8. A stop collar 9 on each of the axles 6 prevents displacement of the axle, from its corresponding sleeve 7, while an arm 10 projects from the upper end of each axle 6 for connection to the corresponding end of the connecting rod 11 which connects the two arms in the manner substantially shown in Fig. 3.

Depending into each of the sleeves 8 is the laterally disposed end portion 12 of the bar, 13. Depending from the draft bars 14—14 which are connected to the bar 13 is the inverted U-shaped frame 15 of angle iron construction, which has its lower end pivotally supporting the U-shaped frame 16 at its free ends, as at 17. The frame 15 is maintained in a vertical position by the brace bars 18. (See Fig. 3.)

Connected at its ends to the legs of the horizontal frame 16 is the bar 19 and interposed between the bar 19 and the opposed portion of the frame 16 are the members 20 for supporting the cultivator elements 21.

At the rear ends of the draft bars 14 are the bearings 22 in which the ends of the shaft 23 are journalled. A cross bar 24 between the draft bars 14—14 supports a post 25. An L-shaped arm 26 extends from the aforementioned shaft 23 and is connected to the said post 25 by the links 27 and 27'. Supported by the rearward ends of the bars 14—14 are the racks or toothed segments 28 with which the detents 29 on the levers 30 are engageable, these levers being secured to the shaft 23 and the lower ends of these levers are connected to ears 31 on the horizontal frame 16 by link members 32.

A pair of handle bars 33—33 are converged and secured together by a plate 34 in the manner as shown in Fig. 1. The bearing strap member 35 connecting the handle bars 33—33 rides on the supporting member 36 carried by the cross bar 13. A pin 37 swingably connects the handle bars to the bar 13 in the manner clearly shown in Fig. 2. A fork 38 straddles the connecting rod 11 between the stops 39, the said fork projecting from the plate 34 at the converging ends of the handle bars 33—33.

It can now be seen that while the machine is in operation, and the cultivator elements 21 are in ground engaged position, the parts are in a position permitting the shifting of the handle bars 33 laterally to steer the wheels 5—5. The levers 30 can be adjusted to various positions to vary the cutting depth of the cultivator elements 21.

When the cultivator frame 16 is raised, and when it is desired that the wheels be locked against manual steering, the levers 30 are forced all the way down, so that the link 27 will engage the fork 40 and lock the steering mechanism.

While the foregoing specification sets forth the invention in specific terms, it is to be understood that numerous changes in the shape, size and materials may be restorted to without departing from the spirit and scope of the invention as claimed hereinafter.

Having thus described my invention, what I claim as new is:—

1. A cotton bunching machine comprising a frame, wheels supporting the frame, a cultivator gang swingably mounted on the frame, means for adjusting the gang, steering means for the wheels, means for securing the steering means against operation, and said last-mentioned means for securing the steering means against operation being operated by the said gang operating means.

2. A device of the class described comprising a yoke shaped bar, a pair of sleeves receiving the ends of said bar, a sleeve connected to each of the first mentioned sleeves, a pair of wheel spindles having vertical parts located in the second mentioned sleeves, an arm on each vertical portion, a rod connecting the arms together, a frame horizontally arranged and supported from the yoke shaped bar, a handle member pivoted to the yoke shaped bar and means for connecting the handle member to the bar which connects the arms together whereby rocking movement of the handle member will rotate the vertical portions of the spindles in the sleeves to steer the device.

3. A device of the class described comprising a yoke shaped bar, a pair of sleeves receiving the ends of said bar, a sleeve connected to each of the first mentioned sleeves, a pair of wheel spindles having vertical parts located in the second mentioned sleeves, an arm on each vertical portion, a rod connecting the arms together, a frame horizontally arranged and supported from the yoke shaped bar, a handle member pivoted to the yoke shaped bar and means for connecting the handle member to the bar which connects the arms together whereby rocking movement of the handle member will rotate the vertical portions of the spindles in the sleeves to steer the device, a vertically arranged frame having its upper edge connected with the first mentioned frame, a horizontal frame having its front edge pivotally secured to the lower edge of the vertical frame, ground engaging elements carried by the horizontal frame, a lever pivoted in a part of the device and connected with the lower rear edge of the horizontal frame for raising and lowering the ground engaging element and means operated by a shaft lever for preventing steering movement of the steering means when the horizontal frame with the ground engaging element is in raised position, such means permitting the steering action when the ground engaging elements are in lowered position.

In testimony whereof I affix my signature.

MILUS SUTTON.